United States Patent
Zhang et al.

(10) Patent No.: US 12,429,861 B2
(45) Date of Patent: Sep. 30, 2025

(54) COMMISSIONING/CONFIGURATION METHOD, TOOL AND COMPUTER-READABLE STORAGE MEDIA FOR AN INDUSTRIAL DEVICE

(71) Applicant: Siemens Aktiengesellschaft, Munich (DE)

(72) Inventors: Yi Chi Zhang, Beijing (CN); Xiao Yue Pang, Beijing (CN); Xin Jin, Beijing (CN); Sheng Zhi Xing, Nan Jing (CN); Jiu Lin Chen, Nan Jing (CN)

(73) Assignee: Siemens Aktiengesellschaft, Munich (DE)

( * ) Notice: Subject to any disclaimer, the term of this patent is extended or adjusted under 35 U.S.C. 154(b) by 532 days.

(21) Appl. No.: 17/422,483

(22) PCT Filed: Jan. 15, 2019

(86) PCT No.: PCT/CN2019/071815
§ 371 (c)(1),
(2) Date: Jul. 13, 2021

(87) PCT Pub. No.: WO2020/147016
PCT Pub. Date: Jul. 23, 2020

(65) Prior Publication Data
US 2022/0057784 A1   Feb. 24, 2022

(51) Int. Cl.
*G05B 19/418* (2006.01)
*G06Q 10/08* (2024.01)

(52) U.S. Cl.
CPC ..... *G05B 19/4188* (2013.01); *G05B 19/4183* (2013.01); *G05B 19/41885* (2013.01); *G06Q 10/08* (2013.01); *G05B 2219/13144* (2013.01)

(58) Field of Classification Search
CPC ............ G05B 19/4188; G05B 19/4183; G05B 19/41885; G05B 2219/13144;
(Continued)

(56) References Cited

U.S. PATENT DOCUMENTS 5,909,372 A * 6/1999 Thybo ................. G05B 19/409
700/83
6,971,004 B1   11/2005 Pleis et al.
(Continued)

FOREIGN PATENT DOCUMENTS

CN   102411350 A   4/2012
CN   102870091 A   1/2013
(Continued)

OTHER PUBLICATIONS

Lafave, Jay. "Commissioning a Siemens G120 VFD with Extended Safety using the Onboard Terminals", Nov. 16, 2016; URL:<https://www.dmcinfo.com/latest-thinking/blog/id/9329/commissioning-a-siemens-g120-vfd-with-extended-safety-using-the-onboard-terminals> (Year: 2016).*

(Continued)

*Primary Examiner* — Kamini S Shah
*Assistant Examiner* — Jonathan Michael Skrzycki
(74) *Attorney, Agent, or Firm* — Harness, Dickey & Pierce, P.L.C.

(57) ABSTRACT

A commissioning method, tool and computer-readable storage media for an industrial device are proposed. A commissioning method for an industrial device includes: determining application type of the industrial device; displaying at least one macro relevant to the application type determined for a user to choose. A displayed macro includes a set of defined parameters of the industrial device relevant to the application type determined. Finally, the commissioning method includes receiving the choice of the user on macro.

14 Claims, 8 Drawing Sheets

(58) Field of Classification Search
CPC ........... G05B 2219/33111; G05B 2219/33116; G05B 2219/33139; G05B 19/4083; G05B 2219/32128; G06Q 10/08; Y02P 90/02; H02P 23/0077; H04W 24/02

See application file for complete search history.

(56) References Cited

U.S. PATENT DOCUMENTS

| | | | |
|---|---|---|---|
| 8,527,949 B1* | 9/2013 | Pleis | G06F 15/7867 |
| | | | 717/121 |
| 8,621,377 B2* | 12/2013 | D'Souza | F24F 11/65 |
| | | | 715/740 |
| 2005/0119765 A1* | 6/2005 | Bergman | B60H 1/00985 |
| | | | 700/16 |
| 2006/0058922 A1 | 3/2006 | Kruk et al. | |
| 2007/0250180 A1 | 10/2007 | Bump et al. | |
| 2009/0222611 A1* | 9/2009 | Becker | G05B 19/054 |
| | | | 710/316 |
| 2011/0224814 A1 | 9/2011 | Mazzarone et al. | |
| 2012/0078869 A1 | 3/2012 | Bellville | |
| 2013/0055122 A1 | 2/2013 | Turnaus | |
| 2013/0167050 A1 | 6/2013 | Colletti et al. | |
| 2014/0081429 A1 | 3/2014 | Miles et al. | |
| 2015/0234381 A1 | 8/2015 | Ratilla et al. | |
| 2015/0248122 A1 | 9/2015 | Norwood | |
| 2016/0092175 A1 | 3/2016 | Keene et al. | |
| 2016/0094628 A1 | 3/2016 | Husain et al. | |
| 2018/0074472 A1* | 3/2018 | Reynolds | G06F 8/34 |
| 2018/0089050 A1 | 3/2018 | Li et al. | |
| 2019/0018559 A1* | 1/2019 | Miles | G06F 3/04847 |

FOREIGN PATENT DOCUMENTS

| | | |
|---|---|---|
| CN | 103176792 A | 6/2013 |
| CN | 103699059 A | 4/2014 |
| CN | 105103178 A | 11/2015 |
| CN | 105260920 A | 1/2016 |
| CN | 106797396 A | 5/2017 |
| CN | 107272610 A | 10/2017 |
| CN | 107885643 A | 4/2018 |
| CN | 108284445 A | 7/2018 |

OTHER PUBLICATIONS

Wikipedia, "Button (Computing)", Internet Archive, 2016, URL:<https://web.archive.org/web/20160411141048/https://en.wikipedia.org/wiki/Button_(computing)> (Year: 2016).*

Jiang et al; "Application scheme design of FIELDBUS on air-conditioner test system"; pp. 160-164; publish Date: Apr. 30, 2007; ( College of Computer Engineering, University of Shanghai for Science and Technology, Shanghai200093, China).

* cited by examiner 1 inverter connected to 3 motors

9902=15
1401=31
1402=31
1403=31
4010=19
4014=1
4016=1
8115=40
8116=20
8117=2
8127=3
4011=set pressure

FIG.1A

| | | | | | | |
|---|---|---|---|---|---|---|
| p205 | | Power unit application | [0] Load duty cycle with high overload for vector drives | | 2 | |
| p206[0] | | Rated power unit power, Rating plate | 146.67 | HP | 2 | |
| p207[0] | | Rated power unit current, Rating plate | 210 | Arms | 2 | |
| p208 | | Rated power unit line supply voltage | 400 | Vrms | 2 | |
| p209[0] | | Power unit, maximum current, Catalog | 307.5 | Arms | 2 | |
| p210 | | Drive unit line supply voltage | 650 | V | 3 | |
| p230 | | Drive filter type, motor side | [0] No filter | | 1 | |
| p233 | | Power unit motor reactor | 0 | mH | 2 | |
| p234 | | Power unit sine-wave filter capacitance | 0 | n F | 2 | |
| p235 | | Number of reactors connected in series | 1 | | 1 | |
| p251[0] | | Operating hours counter power unit fan | 1078 | h | 3 | |
| p278 | | DC link voltage undervoltage threshold reduction | 0 | V | 3 | |
| p287[0] | | Ground fault monitoring thresholds, Threshold for pulse inhibit | 6 | % | 3 | |
| p289 | | Maximum power unit output current | 307.47 | Arms | 3 | Commissioning (P10=1) | 1 63000 |
| p290 | | Power unit overload response | [2] Reduce t_output and t_pulse (not using I2t) | | 3 | |
| p293 | | C0: Power unit alarm threshold model temperature | 50 | °C | 2 | | 0 1900 |
| p294 | | Power unit alarm with I2t overload | 95 | % | 2 | | 0 1900 |
| p295 | | Fan run-on time | 0 | s | 2 | | -1 3 |
| p296 | | DC link voltage undervoltage threshold | 388 | V | 3 | | 0 4294967295 |
| p297 | | DC link voltage overvoltage threshold | 820 | V | 3 | | -50 0 |
| p300[0] | M | Motor type selection | [1] Induction motor (rotating) | | 1 | Ready to run | 0 100 |
| p301[0] | M | Motor code number selection | 0 | | 1 | Commissioning (P10=1,2) | 0 65535 |
| p302[0] | M | Motor code number of motor with DRIVE-CLiQ | 0 | | 2 | Operation | 0 |
| p303[0] | M | Motor code number of motor with DRIVE-CLiQ | 0H | | 2 | Operation | 0 |
| p304[0] | M | Motor status word from motor with DRIVE-CLiQ | 460 | Vrms | 2 | Commissioning (P10=1,2) | 1 |
| p305[0] | M | Rated motor voltage | 150 | Arms | 2 | Ready to run | 0 |
| p306[0] | M | Rated motor current | 1 | | 2 | Ready to run | 0 |
| p307[0] | M | Number of motors connected in parallel | 121 | HP | 2 | Ready to run | 0 26000 |
| p308[0] | M | Rated motor power | 92.7 | % | 2 | Commissioning (P10=1,3) | 0 10000 |
| p309[0] | M | Rated motor efficiency | 60 | Hz | 2 | Commissioning (P10=1,3) | 1 50 |
| p310[0] | M | Rated motor frequency | 888 | rpm | 2 | Commissioning (P10=1,3) | -134102 134102 |
| p311[0] | M | Rated motor speed | 4 | | 2 | Commissioning (P10=1,3) | 0 99.9 |
| p313[0] | M | Motor pole pair number, current (or calculated) | 0 | | 2 | Commissioning (P10=1,3) | 0 3900 |
| p314[0] | M | Motor pole pair number | 0 | Arms | 2 | Commissioning (P10=1,3) | 0 210000 |
| p320[0] | M | Motor rated magnetizing current/short-circuit current | 0.8 | rpm | 2 | Commissioning (P10=1,3) | |
| p322[0] | M | Maximum motor speed | 70.356 | Hz | 2 | Operation | 0 255 |
| p330[0] | M | Rated motor slip | 715.37 | Arms | 2 | Commissioning (P10=1,3) | 0 5000 |
| p331[0] | M | Current motor magnetizing current/short-circuit current | | lbf ft | 2 | | 0 210000 |
| p333[0] | M | Rated motor torque | [0] Non-ventilated | | 1 | | |
| p335[0] | M | Motor cooling type | 60 | Hz | 3 | Ready to run | |
| p336[0] | M | Current rated motor frequency | 396.1 | Vrms | 3 | Ready to run | 0 |
| p337[0] | M | Rated motor EMF | 460 | Vrms | 3 | Operation | 1 10000 |
| p339[0] | M | Rated motor voltage | [0] No calculation | | 1 | Ready to run | 0 110232 |
| p340[0] | D | Automatic calculation, motor/control parameters | 101.449532 | lb ft² | 3 | Operation | |
| p341[0] | M | Motor moment of inertia | 1 | | 3 | Operation | 0 2.37E+06 |
| p342[0] | M | Ratio between the total and motor moment of inertia | 2387 | lb | 3 | Operation | 1 10000 |
| p344[0] | M | Motor weight (for the thermal motor model) | 0.41 | s | 3 | Ready to run | 0 110232 |
| p345[0] | M | Nominal motor starting time | 1.199 | s | 3 | Operation | |
| p346[0] | M | Motor excitation build-up time | 1.565 | s | 3 | Operation | 0 20 |
| p347[0] | M | Motor de-excitation time | [1] System of units, physical | | 1 | Commissioning (P10,3) | 0 20 |
| p349 | | System of units, motor equivalent circuit diagram data | 0.03154 | Ohm | 3 | Operation | 0 2900 |
| p350[0] | M | Motor stator resistance, cold | 0 | Ohm | 3 | Operation | 0 120 |
| p352[0] | M | Cable resistance | | | | | |

FIG. 1B

Macros

Options:
- Standard
- 3-wire
- PID
- Hand/PID
- Hand/Auto
- Alternate
- Motor potentiometer
- Panel PID
- PFC
- SPFC

FIG.2

COMMISSIONING/CONFIGURATION METHOD, TOOL AND COMPUTER-READABLE STORAGE MEDIA FOR AN INDUSTRIAL DEVICE

PRIORITY STATEMENT

This application is the national phase under 35 U.S.C. § 371 of PCT International Application No. PCT/CN2019/071815 which has an International filing date of Jan. 15, 2019, the entire contents of which are hereby incorporated herein by reference.

FIELD

Embodiments of the present application generally relate to techniques of industry, and more particularly to a commissioning method, tool and computer-readable storage media for an industrial device.

BACKGROUND

Commissioning/configuration is a necessary step before an industrial device, such as an inverter, a motor, etc. comes to use. However, some current commissioning processes are relatively comprehensive, and require engineering expertise.

Taking an inverter as an example, current commissioning process for an inverter in a pump or fan is usually unnecessarily complex. An inverter expert with electrical engineering expertise is always needed on site to commission an inverter, though technical requirement for inverter's function is comparatively simple, especially for pump or fan applications.

As shown in FIG. 1A, to achieve a certain pump application, a user only needs to set parameters listed. However FIG. 1B shows only part of parameters the commissioning tool provides, which are more than what a user needs. What's more, inverter parameters in the commissioning tool are grouped according to technology, so users have to select parameters to set from a huge pool, which makes commissioning even difficult and time-consuming. And for the grouping way according to technology, a user has to gain technical skills to commission an inverter, which also increases difficulty in commissioning.

For some commissioning tools, macros are predefined to help commissioning. However, macros are usually defined to differentiate parameter values, which still can't make commissioning easier. Macros of a current commissioning tool are shown in FIG. 2, in which "standard" means parameter values fall into standard ranges; "3-wire" corresponds to a kind of connecting way, in such a way, parameters related to start and stop fall into a set range. For other macros: "PID", "Hand/PID (Proportion Integration Differentiation)", "Hand/Auto", "Alternate", "Motor potentiometer", "Panel PID", "PFC (Power Factor Correction)", "SPFC (Soft Power Factor Correction)", each corresponds to a specific parameter value range. With such a commissioning tool, users still have to select parameters to set from a large pool.

SUMMARY

A commissioning method, tool and computer-readable storage media for an industrial device are proposed in embodiments of this invention, to make a commissioning tool easy to use. In embodiments of solutions provided, macros are predefined according to different application types, once a user chooses a desired application type, a macro corresponding to the chosen application will be presented and limited number of parameters related to the chosen application type and predefined in the presented macro will be presented to the user for value setting. With the embodiments of the solutions, a user needn't select parameters from a large pool, and limited number of parameters related to the application type are presented to the user, which makes commissioning much easier.

Herein, a macro can include a predefined set of parameters of the industrial device. Optionally, a parameter's value or value range can also be predefined in a macro. An application type can be a user-oriented concept, application types can be differentiated according to application scenarios and/or using ways towards an industrial device. Taking an inverter as an example, application types can be a heavy-duty one or a light-duty one. For a light-duty application, it can be classified further into a pump, a fan and other light-duty application types.

According to a first embodiment of the present disclosure, a commissioning method for an industrial device is presented, the method includes:
 determining application type of the industrial device;
 displaying at least one macro relevant to the determined application type for a user to choose, wherein a displayed macro includes a set of predefined parameters of the industrial device relevant to the determined application type; and
 receiving the user's choice on macro.

According to a second embodiment of the present disclosure, a commissioning tool for an industrial device is presented, the commissioning tool includes:
 a processing module, configured to determine application type of the industrial device;
 a displaying module, configured to display at least one macro relevant to the determined application type for a user to choose, wherein a displayed macro includes a set of predefined parameters of the industrial device relevant to the determined application type; and
 a user input receiving module, configured to receive the user's choice on macro.

According to a third embodiment of the present disclosure, a commissioning tool for an industrial device is presented, the commissioning tool includes:
 at least one memory, configured to store instructions;
 at least one processor, coupled to the at least one memory, and upon execution of the executable instructions, configured to:
  determine application type of the industrial device;
  display at least one macro relevant to the determined application type for a user to choose, wherein a displayed macro includes a set of predefined parameters of the industrial device relevant to the determined application type; and
  receive the user's choice on macro.

According to a fourth embodiment of the present disclosure, a computer-readable storage media is presented, it stores executable instructions, which upon execution by a computer, enables the computer to execute the method of the first embodiment of the present disclosure.

BRIEF DESCRIPTION OF THE DRAWINGS

The above mentioned attributes and other features and advantages of the present technique and the manner of attaining them will become more apparent and the present technique itself will be better understood by reference to the following description of embodiments of the present technique taken in conjunction with the accompanying drawings, wherein:

FIG. 1A depicts parameters to be set for a pump application of an inverter.

FIG. 1B depicts part of parameters a commissioning tool of an inverter provides.

FIG. 2 depicts macros defined by a current commissioning tool of an inverter.

Figure 3:
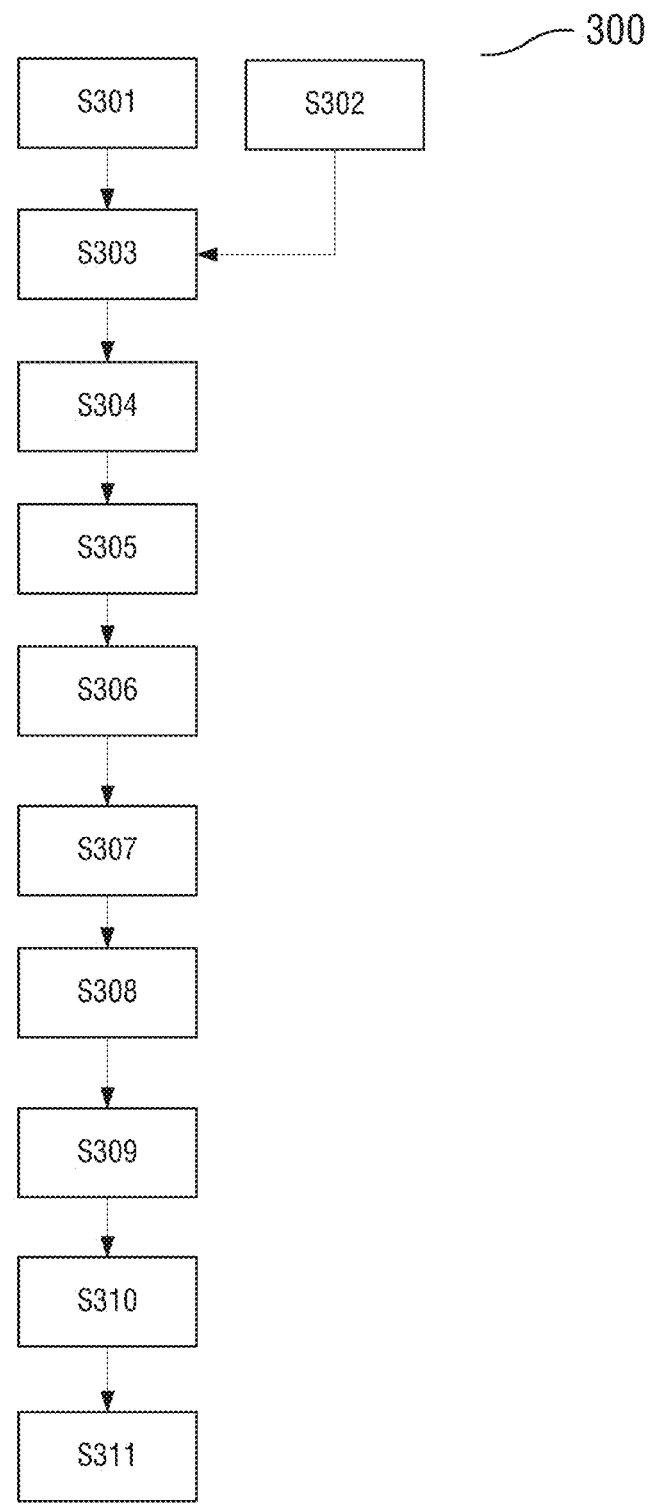
FIG. 3 depicts a flow chart for commissioning method of the present disclosure.

REFERENCE NUMBERS 300,400, commissioning methods of the present disclosure
S301~S311, steps of commissioning method 300
S401~S407, steps of commissioning method 400
800,900, commissioning tools of the present disclosure
801, a processing module
802, a displaying module
803, a user input receiving module
901, at least one memory
902, at least one processor
903, displayer

DETAILED DESCRIPTION OF EXAMPLE EMBODIMENTS

According to a first embodiment of the present disclosure, a commissioning method for an industrial device is presented, the method includes:
  determining application type of the industrial device;
  displaying at least one macro relevant to the determined application type for a user to choose, wherein a displayed macro includes a set of predefined parameters of the industrial device relevant to the determined application type; and
  receiving the user's choice on macro.

According to a second embodiment of the present disclosure, a commissioning tool for an industrial device is presented, the commissioning tool includes:
  a processing module, configured to determine application type of the industrial device;
  a displaying module, configured to display at least one macro relevant to the determined application type for a user to choose, wherein a displayed macro includes a set of predefined parameters of the industrial device relevant to the determined application type; and
  a user input receiving module, configured to receive the user's choice on macro.

According to a third embodiment of the present disclosure, a commissioning tool for an industrial device is presented, the commissioning tool includes:

at least one memory, configured to store instructions;
  at least one processor, coupled to the at least one memory, and upon execution of the executable instructions, configured to:
    determine application type of the industrial device;
    display at least one macro relevant to the determined application type for a user to choose, wherein a displayed macro includes a set of predefined parameters of the industrial device relevant to the determined application type; and
    receive the user's choice on macro.

According to a fourth embodiment of the present disclosure, a computer-readable storage media is presented, it stores executable instructions, which upon execution by a computer, enables the computer to execute the method of the first embodiment of the present disclosure.

With the solutions provided, a user needn't select parameters from a large pool, only limited number of the application type relevant parameters are presented to the user, which makes commissioning much easier.

In an embodiment of the present disclosure, control type of the industrial device is also determined, and the at least one macro relevant to the determined application type and the determined control type are displayed for the user to choose. In this embodiment, a displayed macro includes a set of predefined parameters of the industrial device relevant to the determined application type and the determined control type. Parameters of an industrial device usually vary with control type of the industrial device, so with control type together with the determined application type, numbers of macros and parameters presented to a user can be further limited and parameters will be further limited to what a user is familiar with.

In an embodiment of the present disclosure, at least one parameter predefined in the chosen macro is determined, or at least one parameter predefined in the chosen macro is determined based on the determined application type, or at least one parameter predefined in the chosen macro is determined based on the determined control type, or at least one parameter predefined in the chosen macro is determined based on the determined control type and the determined application type. The determined parameters are displayed to the user to set. Only important parameters are displayed to user to set, and for the parameters defined in the chosen macro, they can take default value. With this solution, commissioning of the industrial device can be further simplified.

In an embodiment of the present disclosure, as to determination of application type of the industrial device, the user's choice on application type is received, the chosen application type is determined as the determined application type.

In an embodiment of the present disclosure, as to determination of application type of the industrial device, the user's choice on control type is received, the chosen control type is determined as the determined control type.

In an embodiment of the present disclosure, predefined terminals of the industrial device to be set according to the chosen macro are displaying and the user's setting on the terminals is received.

In an embodiment of the present disclosure, the predefined terminals of the industrial device are displayed in a way of hardware layout.

In an embodiment of the present disclosure, for each predefined terminal of the industrial device, predefined default function value in the chosen macro is displayed.

In an embodiment of the present disclosure, a button is displayed for a user to edit at least one terminal of the industrial device.

With solutions provided in the above terminal related embodiments, terminals are displayed in a more user-friendly way, which will make it easier for a user to set terminals during commissioning of an industrial device.

In an embodiment of the present disclosure, the industrial device is an inverter, identification value of at least one motor connected to the inverter is determined based on the determined application type, and the determined identification value is displayed during motor identification. With the solution, the process of motor identification can be simplified.

Hereinafter, above-mentioned and other features of the present technique are described in details. Various embodiments are described with reference to the drawing, where like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

When introducing elements of various embodiments of the present disclosure, the articles "a", "an", "the" and "said" are intended to mean that there are one or more of the elements. The terms "comprising", "including" and "having" are intended to be inclusive and mean that there may be additional elements other than the listed elements.

For an industrial device, such as an inverter, a motor, etc., it has to be commissioned or configured before coming to use. The commissioning/configuration include setting values for parameters of the industrial device. Taking an inverter as an example, common parameters such as "limits" and PID has to be set. And a motor connected to the inverter has to be identified before the inverter comes to use. In the present technique, macros are predefined according to application type, and optionally also according to control type. For the macros are predefined according to application type, commissioning will be easier to operate without too much effort in understanding technical meanings of parameters. And only limited number of parameters will be presented, then a user need not to choose parameters from a large pool.

The present technique has been described hereinafter in details by referring to FIG. 3 to FIG. 9.

FIG. 3 depicts a flow chart for commissioning method 300 for an industrial device of the present disclosure. The commissioning method 300 can be executed by a commissioning tool 800 or 900 of the present disclosure. The commissioning method 300 includes following steps:

S301: determining application type of the industrial device.

Herein, an application type is a user-friendly classification way for an industrial device, which can be a user-oriented concept. Application types can be differentiated according to application scenarios and/or using ways towards an industrial device, a user can easily understand the concept of an application type other than a technology concept. Taking an inverter as an example, application types can be a heavy-duty one or a light-duty one. For a light-duty application, it can be classified further into a pump, a fun and other light-duty application types.

The commissioning tool 800 (here taking commissioning tool 800 as an example, steps in method 300 and method 400 can be executed by commissioning tool 800 or 900) can first present several choices of application type for a user to choose, then receives the user's choice on application type and determines the chosen application type as the determined application type.

The commissioning tool 800 can also determines the application type according to pictures of the industrial device. From the shape, outline and appearance characteristics of the industrial device extracted from the pictures, the commissioning tool 800 can determine the application type. The commissioning tool 800 can also determines the application type according to pictures taken on the plate of the industrial device, and recognize characters on the plate.

S303: displaying at least one macro relevant to the determined application type for a user to choose, wherein a displayed macro includes a set of parameters of the industrial device relevant to the determined application type. Optionally, a parameter's value or value range can also be predefined in a macro.

Usually, there will be several macros for a user to choose, for some application type, there may be just one relevant macro, which the user can just choose the only one macro.

Optionally, before the step S303, in step S302, the commissioning tool 800 can also determine control type of the industrial device. Taking an inverter as an example, the control type can include: "PID function is used", and "PID function is not used". Then in the step S303, at least one macro relevant to the determined application type and the determined control type will be displayed for the user to choose, wherein a displayed macro includes a set of parameters of the industrial device relevant to the determined application type and the determined control type.

The commissioning tool 800 can first present several choices of control types for the user to choose, then receives the user's choice on control type and determines the chosen control type as the determined control type.

S304: receiving the user's choice on macro.

for the at least one displayed macro for the user to choose is relevant to the determined application type, that is, the macros are predefined according to application type, which is more user-friendly and easy to understand, the above method is easier to use in comparison to current commissioning methods. And for a macro is predefined as only including parameters relevant to the determined application, so limited number of parameters will be presented, with which the user need not have to choose parameters from a large pool.

Optionally, after the step S304, in step S305, the commissioning tool 800 can display predefined terminals of the industrial device to be set according to the chosen macro, and in step S306, receive the user's setting on the terminals and set the terminals according to the received setting.

Optionally, the commissioning tool 800 can display the predefined terminals of the industrial device in a way of hardware layout.

Optionally, for each predefined terminal of the industrial device, the commissioning tool 800 can display predefined default function value in the chosen macro.

Optionally, the commissioning tool 800 can display a button for a user to edit at least one terminal of the industrial device. After the user clicks the button, he/she can edit at least one terminal which hasn't been configured before.

Optionally, after the step S306, in step S307, the commissioning tool 800 can determine and at least one parameter for the user to set and in step S308 the commissioning tool 800 can display the determined at least one parameter. The optional embodiments include but not limit to:

The commissioning tool 800 can determine and display all the parameters predefined in the chosen macro;

The commissioning tool 800 can determine at least one parameter predefined in the chosen macro, based on the determined application type, and display the determined at least one parameter for the user to set;

The commissioning tool 800 can determine at least one parameter predefined in the chosen macro, based on the determined control type, and display the determined at least one parameter for the user to set; and The commissioning tool 800 can determine at least one parameter predefined in the chosen macro, based on the determined control type and the determined application type, and display the determined at least one parameter for the user to set;

The commissioning tool 800 can determine and display all the parameters predefined in the chosen macro, based on terminals set in the step S306;

The commissioning tool 800 can determine at least one parameter predefined in the chosen macro, based on the determined application type and terminals set in the step S306, and display the determined at least one parameter for the user to set;

The commissioning tool 800 can determine at least one parameter predefined in the chosen macro, based on the determined control type and terminals set in the step S306, and display the determined at least one parameter for the user to set; and The commissioning tool 800 can determine at least one parameter predefined in the chosen macro, based on the determined control type, the determined application type, and the terminals set in the step S306 and display the determined at least one parameter for the user to set.

Although according to the step S303, the set of predefined parameters included in a macro are limited and relevant to the determined application type (optionally, also relevant to the determined control type). However, there will still be quite a lot of parameters in a macro to be set. In this step S307 and S308, parameters are further filtered, only predefined key parameters are determined and displayed for the user to set. For other parameters, they can take default values predefined in a macro. With this step S307, burden of commissioning can be further lessened.

After the step S306 and optionally after the step S308, in step S309, the commissioning tool 800 can set motor data. In step S310, the commissioning tool determines identification value of at least one motor connected to the inverter, based on the determined application type. In step S311, display the determined identification value when executing motor identification. Here, motor data's setting is independent of application type or control type, so it can be set any time during commissioning.

Figure 4:
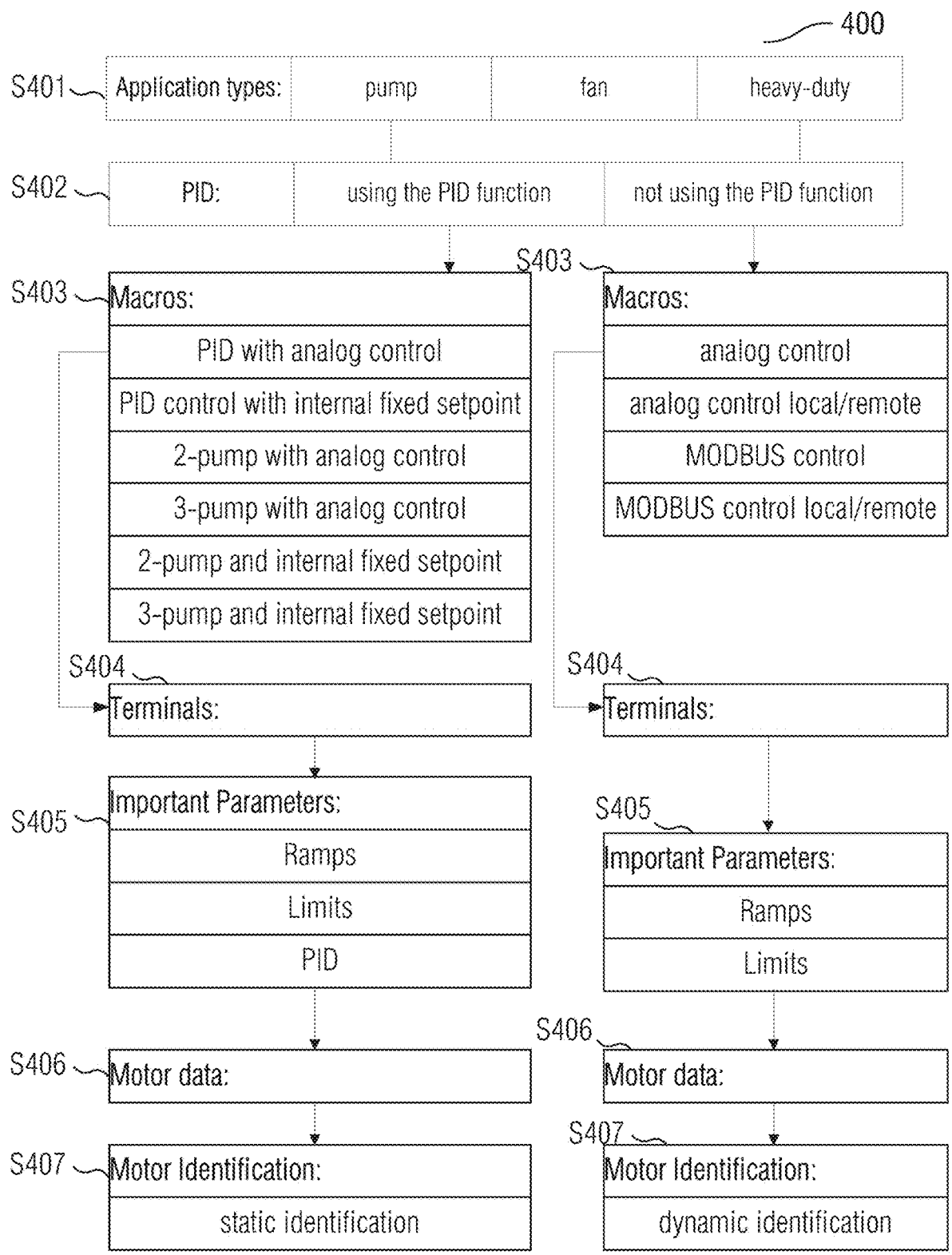
FIG. 4 depicts commissioning procedure of an inverter using the commission method of the present disclosure.

FIG. 4 depicts commissioning procedure of an inverter using the commission method 400 of the present disclosure. This procedure can be executed by the commissioning tool 800 of the present disclosure. There are following steps in the procedure:

S401: the commissioning tool 800 displays application types for a user to choose, and receives the user's choice. The application types include but not limited to "pump", "fan", and "heavy-duty", and "pump" and "fan" are two types of "light-duty".

S402: the commissioning tool 800 displays control types for the user to choose, the control types include but not limit to "using the PID function", "not using the PID function". And the commissioning tool 800 receives the user's choice.

S403: the commissioning tool 800 determines at least one macro relevant to the chosen application type and chosen control type to be displayed for the user to choose and displays the determined at least one macro. And the commissioning tool 800 receives the user's choice.

For example, if the user chooses "pump" and "using the PID function", then the commissioning tool 800 determines to display following macros:
  "PID with analog control"
  "PID control with internal fixed setpoint"
  "2-pump with analog control"
  "3-pump with analog control"
  "2-pump and internal fixed setpoint"
  "3-pump and internal fixed setpoint"

If the user chooses "heavy-duty" and "not using the PID function", then the commissioning tool 800 determines to display following macros:
  "analog control"
  "analog control local/remote"
  "MODBUS control"
  "MODBUS control local/remote"

S404: the commissioning tool 800 displays predefined terminals of the industrial device to be set according to the chosen macro, and receives the user's setting on the terminals.

S405: the commissioning tool 800 determines at least one important parameter for the user to set value and displays the determined at least one important parameter. And the commissioning tool 800 receives the user's setting.

As described in above mentioned step S307, there are several options for the commissioning tool 800 to determine the important parameter(s).

In the process of an inverter commissioning, a user has to define terminals' function (input and output) to achieve controlling goal. For complex controlling situation such as PID with analog control, the user has to set the relevant functions one by one. For a less experienced new user, he/she may make mistake on both selecting terminals and selecting functions.

Currently, a user has to setup different functions for each terminal according to manual, which is time consuming and prone to make mistakes.

Figure 5:
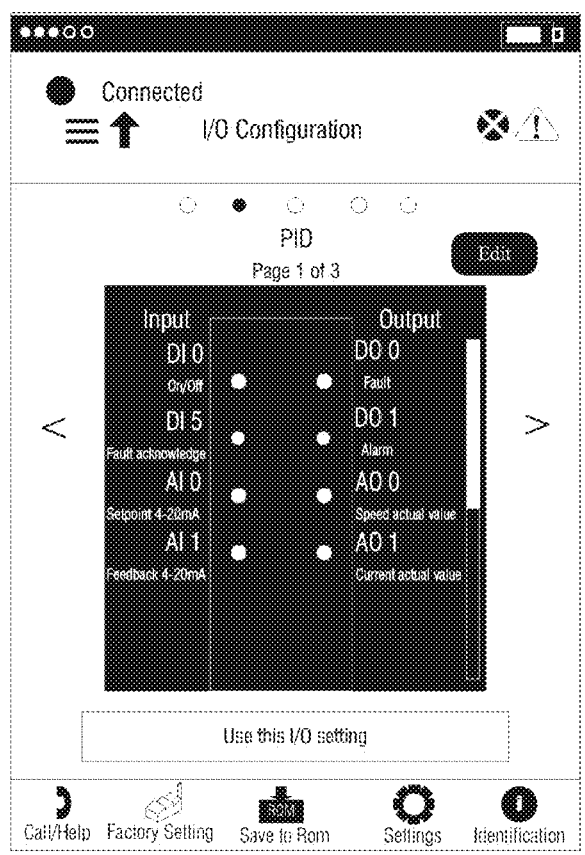
FIG. 5-FIG. 7 depict user interfaces commissioning terminals of an inverter using the commission method of the present disclosure.

Referring to FIG. 5, if a user chooses "PID with analog control" for macro, then predefined input terminals DI 0, DI 5, AI 0, AI 1 and output terminals DO 1, DO 1, AO 0, AO 1 in the macro are displayed. And optionally they can be displayed in a way of the inverter's terminals' layout, which is intuitive and clear. For each predefined terminal of the inverter, predefined default function value can also be displayed. For DI 0, the predefined default function value is "On/Off"; for DO 0, the predefined default function value is "fault". The predefined default function value can help a user easily achieve the commissioning goal, even he/she doesn't have much knowledge of the inverter.

Figure 6:
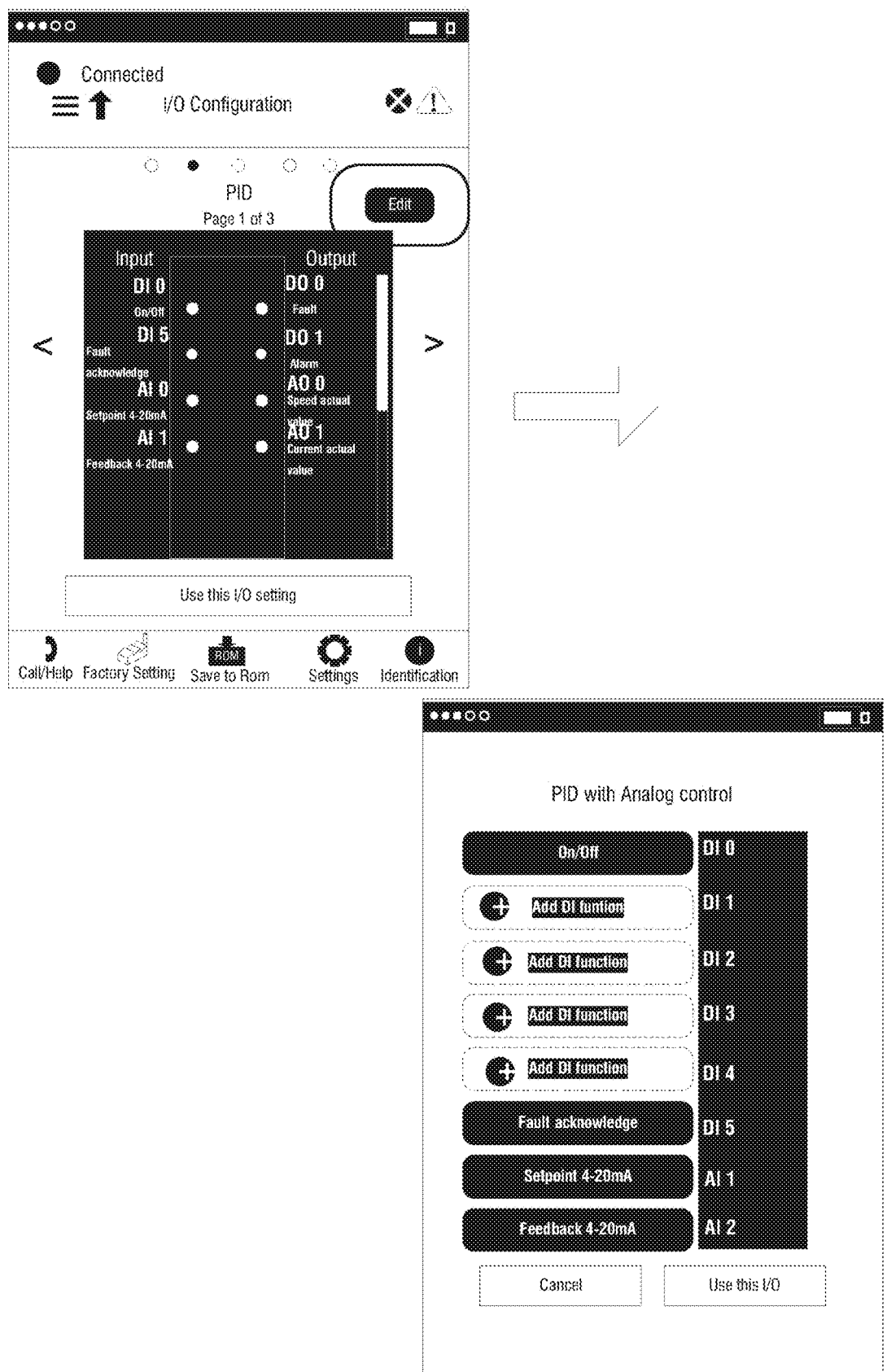

A User can also do other complex PID control based on the macro "PID with analog control". Referring to FIG. 6, if a user wants to add other functions or change some functions of terminals, he/she could click on the button "Edit" to customize. For example, if they are using PID control with auto/manual switch over, they could customize the "PID with analog control" by adding "auto/manual" function on a DI terminal, such as DI 1, DI 2, DI 3 and DI 4. After setting each terminal, the user can click on the button "Use this I/O" to finish setting, or click on the button "Cancel" to give up the setting.

A user can also change an existing function of a terminal. He/she can also add a new function to an empty terminal (which has no function yet).

Figure 7:
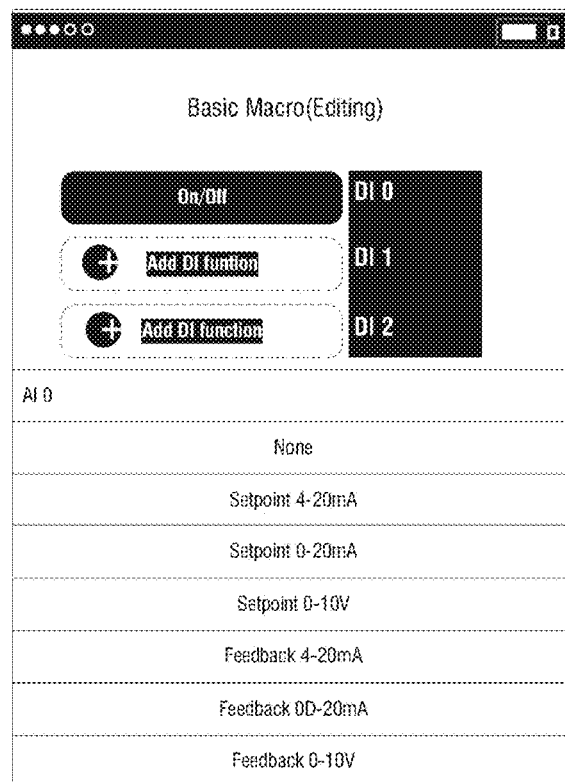

Referring to FIG. 5-FIG. 7, a button-like visual design is provided to explain terminals and their functions. In order to emphasize differences between input terminals and output ones, a design splits input terminals on the left side, and output terminals on the right side, which helps distinguish. And to lessen burden of function selection, the commissioning tool 800 only displays functions related to the chosen macro. For example, for macro "PID with analog control", the user can find the function of "PID feedback" in the AI terminals. However, it can not be found in non-PID Macros.

S406: the commissioning tool 800 receives motor data set by the user. This step can be executed any time during commissioning.

S407: the commissioning tool 800 displays motor identification modes for the user to choose and receives the user's choice, such as "static identification" and "dynamic identification". Optionally, the commissioning tool 800 can also determines a motor identification mode based on application type and/or control type and display for the user to confirm or modify.

In the above procedure 400, application type and control type are filters, and in each condition macros, important parameters, and motor identification mode contain only selections that make sense. For example, if it is a pump application and using PID function, the macros will be narrowed down to the 6 choices shown on the left of FIG. 4. If it is a heavy-duty application and not using PID function, the macros will contain different selections, as shown on the right of FIG. 5. Important parameters and motor identification mode will also change accordingly. The content shown in the commissioning process will only be the one that makes sense, based on the filters.

This procedure 400 of the commissioning tool 800 filters inverter parameters by application and PID usage, so only parameters that make sense in a specific application and PID usage would be presented to users. The important parameters in the step S404 are further filtered by the selected macro. Also, macros are redefined based on the actual pump and fan use cases, and they are selected to match each application and PID usage condition.

With the above mentioned methods 300 and 400, a user with little inverter knowledge can successfully setup an industrial device on their own. A users is only exposed with parameters that are related to application type, and optionally control type). The application type and control type are what a user is familiar with and understands, so they can better set values to the parameters, and then commission the industrial device more efficiently.

And for macros are redefined to specific application and optionally specific control type, a user can setup an industrial device with one click, rather than making customization on macros.

Figure 8:
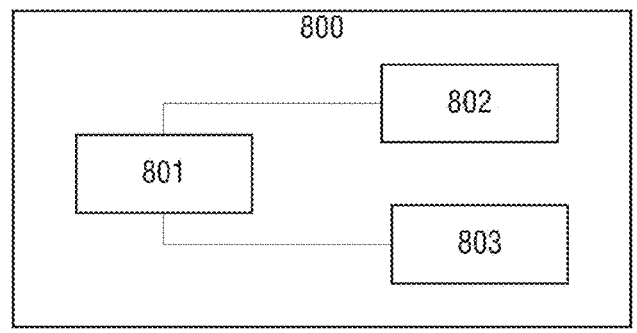
FIG. 8 depicts a block diagram displaying an exemplary embodiment of a commissioning tool of the present disclosure.

FIG. 8 depicts a block diagram displaying an exemplary embodiment of a commissioning tool of the present disclosure. Referring to FIG. 8, the commissioning tool 800 may include:

a processing module 801, configured to determine application type of the industrial device;

a displaying module 802, configured to display at least one macro relevant to the determined application type for a user to choose, wherein a displayed macro includes a set of predefined parameters of the industrial device relevant to the determined application type; and a user input receiving module 803, configured to receive the user's choice on macro.

Optionally, the processing module 801 is further configured to: determine control type of the industrial device, before the displaying module 802 displays at least one macro relevant to the determined application type for a user to choose; the displaying module 802 is further configured to: display at least one macro relevant to the determined application type and the determined control type for the user to choose, wherein a displayed macro includes a set of predefined parameters of the industrial device relevant to the determined application type and the determined control type.

Optionally, the processing module 801 is further configured to determine at least one parameter predefined in the chosen macro after the user input receiving module 803 receives the user's choice on macro; and the displaying module 802 is further configured to display the determined at least one parameter for the user to set; or the processing module 801 is further configured to determine at least one parameter predefined in the chosen macro, based on the determined application type, after the user input receiving module 803 receives the user's choice on macro; and the displaying module 802 is further configured to display the determined at least one parameter for the user to set.

Optionally, the processing module 801 is further configured to determine at least one parameter predefined in the chosen macro, based on the determined control type, after the user input receiving module 803 receives the user's choice on macro; and the displaying module 802 is further configured to display the determined at least one parameter for the user to set, or the processing module 801 is further configured to determine at least one parameter predefined in the chosen macro, based on the determined control type and the determined application type, after the user input receiving module 803 receives the user's choice on macro; and the displaying module 802 is further configured to display the determined at least one parameter for the user to set.

Optionally, the user input receiving module 803 is further configured to receive the user's choice on application type, and the processing module 801 is further configured to determine the chosen application type as the determined application type.

Optionally, the user input receiving module 803 is further configured to receive the user's choice on control type; the processing module 801 is further configured to determine the chosen control type as the determined control type.

Optionally, the displaying module 802 is further configured to display predefined terminals of the industrial device to be set according to the chosen macro, after the user input receiving module 803 receives the user's choice on macro; the user input receiving module 803 is further configured to receive the user's setting on the terminals.

Optionally, the display module 802 is further configured to:

display the predefined terminals of the industrial device in a way of hardware layout; and/or for each predefined terminal of the industrial device, display predefined default function value in the chosen macro; and/or display a button for a user to edit at least one terminal of the industrial device.

Optionally, the industrial device is an inverter, the processing module 801 is further configured to determine identification value of at least one motor connected to the inverter, based on the determined application type; the displaying module 802 is further configured to display the determined identification value during motor identification.

Optionally, the processing module 801, displaying module 802 and the user input receiving module 803 can be software modules which include executable instructions. The software modules can be stored in at least one memory and upon execution of the executable instruction in the modules by at least one processor, the at least one processor will execute methods 300 or 400 of the present disclosure.

Figure 9:
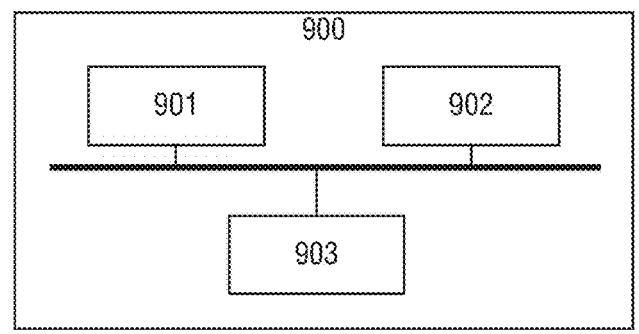
FIG. 9 depicts a block diagram displaying an exemplary embodiment of a commissioning tool of the present disclosure.

FIG. 9 depicts a block diagram displaying an exemplary embodiment of a commissioning tool of the present disclosure. Referring to FIG. 9, the commissioning tool 900 may include:

at least one memory 901, configured to store instructions;
at least one processor 902, coupled to the at least one memory 901, and upon execution of the executable instructions, configured to:
determine application type of the industrial device;
display at least one macro relevant to the determined application type for a user to choose, wherein a displayed macro includes a set of predefined parameters of the industrial device relevant to the determined application type; and
receive the user's choice on macro;
a displayer 903, to display user interfaces to the user.

Optionally, the at least one processor 902 is further, upon execution of the executable instructions, configured to:
before displaying at least one macro relevant to the determined application type for a user to choose, determine control type of the industrial device;
when displaying at least one macro relevant to the determined application type for a user to choose, display at least one macro relevant to the determined application type and the determined control type, wherein a displayed macro includes a set of predefined parameters of the industrial device relevant to the determined application type and the determined control type.

Optionally, the at least one processor 902 is further, upon execution of the executable instructions, configured to: after receiving the user's choice on macro,
determine at least one parameter predefined in the chosen macro; and display the determined at least one parameter for the user to set; or
determine at least one parameter predefined in the chosen macro, based on the determined application type; and display the determined at least one parameter for the user to set.

Optionally, the at least one processor 902 is further, upon execution of the executable instructions, configured to: after receiving the user's choice on macro,
determine at least one parameter predefined in the chosen macro, based on the determined control type; and display the determined at least one parameter for the user to set, or
determine at least one parameter predefined in the chosen macro, based on the determined control type and the determined application type; and display the determined at least one parameter for the user to set.

Optionally, the at least one processor 902 is further, upon execution of the executable instructions, configured to: when determining application type of the industrial device,
receive the user's choice on application type, and
determine the chosen application type as the determined application type.

Optionally, the at least one processor 902 is further, upon execution of the executable instructions, configured to: when determining control type of the industrial device,
receive the user's choice on control type, and
determine the chosen control type as the determined control type.

Optionally, the at least one processor 902 is further, upon execution of the executable instructions, configured to: after receiving the user's choice on macro,
display predefined terminals of the industrial device to be set according to the chosen macro;
receive the user's setting on the terminals.

Optionally, the at least one processor 902 is further, upon execution of the executable instructions, configured to: when displaying predefined terminals of the industrial device to be set according to the chosen macro,
display the predefined terminals of the industrial device in a way of hardware layout; and/or
for each predefined terminal of the industrial device, display predefined default function value in the chosen macro; and/or
display a button for a user to edit at least one terminal of the industrial device.

Optionally, the industrial device is an inverter, the at least one processor 902 is further, upon execution of the executable instructions, configured to:
determine identification value of at least one motor connected to the inverter, based on the determined application type;
display the determined identification value during motor identification.

A computer-readable medium is also provided in the present disclosure, storing executable instructions, which upon execution by a computer, enables the computer to execute any of the methods presented in this disclosure.

A computer program, which is being executed by at least one processor and executes any of the methods presented in this disclosure.

While the present technique has been described in detail with reference to certain embodiments, it should be appreciated that the present technique is not limited to those precise embodiments. Rather, in view of the present disclosure which describes exemplary modes for practicing the invention, many modifications and variations would present themselves, to those skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. A commissioning method for an industrial device, comprising:
determining control type of the industrial device;
determining application type of the industrial device;
displaying, on a display screen, at least one macro relevant to the application type determined and the control type determined, for the user to choose, and wherein a displayed macro includes a set of defined parameters of the industrial device relevant to the application type determined and the control type determined;
receiving a macro chosen by a user from the displayed at least one macro relevant to the control type determined and the application type determined;
displaying, in a way of hardware layout, defined terminals of the industrial device to be set according to the macro chosen, wherein input terminals are displayed on a left side of the display screen and output terminals are displayed on a right side of the display screen, and for each respective defined terminal of the defined terminals of the industrial device, displaying a respective defined default function value in the macro chosen, and showing only functions related to the macro chosen;
receiving user selected settings for the defined terminals;
and configuring the industrial device based on the macro chosen relevant to the application type determined and the control type determined.

2. The method of claim 1, wherein after the receiving of the macro chosen relevant to the application type, the method further comprises:
determining at least one parameter defined in the macro chosen and displaying the at least one parameter determined, for the user to set; or
determining at least one parameter defined in the macro chosen, based on the application type determined and displaying the at least one parameter determined for the user to set.

3. The method of claim 1, wherein after the receiving of the macro chosen relevant to the application type, the method further comprises:
determining at least one parameter defined in the macro chosen, based on the control type determined and displaying the at least one parameter determined for the user to set, or
determining at least one parameter defined in the macro chosen, based on the control type determined and the application type determined and displaying the at least one parameter determined for the user to set.

4. The method of claim 1, wherein the determining of the application type of the industrial device comprises:
receiving the application type chosen by the user, and
determining the application type chosen as the application type determined.

5. The method of claim 1, wherein the determining of the control type of the industrial device, comprises:
receiving the control type chosen by the user, and
determining the control type chosen as the control type determined.

6. The method of claim 1, wherein the displaying of the defined terminals of the industrial device to be set according to the macro chosen, comprises:
displaying an edit button for a user to edit at least one terminal of the industrial device; and
receiving activation of the edit button and user input of at least one of adding or changing a function of a selected terminal.

7. The method of claim 1, wherein the industrial device is an inverter, and wherein the method further comprises:
determining identification value of at least one motor connected to the inverter, based on the application type determined; and
displaying the determined identification value during motor identification.

8. The method of claim 1, wherein the displaying includes displaying a further user selectable parameter for each respective defined default function value in the macro chosen, and showing only functions related to the chosen macro.

9. A commissioning tool for an industrial device, comprising:
at least one memory, configured to store executable instructions;
and at least one processor, coupled to the at least one memory, and upon execution of the executable instructions, configured to:
determine control type of the industrial device;
determine application type of the industrial device;
display, on a display screen, at least one macro relevant to the application type determined and the control type determined, for the user to choose, and wherein a displayed macro includes a set of defined parameters of the industrial device relevant to the application type determined and the control type determined;
receive a macro chosen by a user from the displayed at least one macro relevant to the control type determined and the application type determined;
display, in a way of hardware layout, defined terminals of the industrial device to be set according to the macro chosen, wherein input terminals are displayed on a left side of the display screen and output terminals are displayed on a right side of the display screen, and for each respective defined terminal of the defined terminals of the industrial device, displaying a respective defined default function value in the macro chosen, and showing only functions related to the macro chosen;
receive user selected settings for the defined terminals;
and configuring the industrial device based on the macro chosen relevant to the application type determined and the control type determined.

10. The commissioning tool of claim 9, wherein the at least one processor is further, upon execution of the executable instructions, configured to: after receiving the macro chosen relevant to the application type,
determine at least one parameter defined in the macro chosen and display the at least one parameter determined for the user to set; or
determine at least one parameter defined in the macro chosen, based on the application type determined and display the at least one parameter determined for the user to set.

11. The commissioning tool of claim 9, wherein the at least one processor is further, upon execution of the executable instructions, configured to: after receiving the macro chosen relevant to the application type,
determine at least one parameter defined in the macro chosen, based on the control type determined and display the at least one parameter determined for the user to set, or
determine at least one parameter defined in the macro chosen, based on the control type determined and the application type determined and display the at least one parameter determined for the user to set.

12. A non-transitory computer-readable medium, storing executable instructions, which upon execution by a computer, enables the computer to execute at least:
determining control type of an industrial device;
determining application type of the industrial device;
displaying, on a display screen, at least one macro relevant to the application type determined and the control type determined, for the user to choose, and wherein a displayed macro includes a set of defined parameters of the industrial device relevant to the application type determined and the control type determined;
receiving a macro chosen by a user from the displayed at least one macro relevant to the control type determined and the application type determined;

displaying, in a way of hardware layout, defined terminals of the industrial device to be set according to the macro chosen, wherein input terminals are displayed on a left side of the display screen and output terminals are displayed on a right side of the display screen, and for each respective defined terminal of the defined terminals of the industrial device, displaying a respective defined default function value in the macro chosen, and showing only functions related to the macro chosen;

receiving user selected settings for the defined terminals; and configuring an industrial device based on the macro chosen relevant to the application type determined and the control type determined.

13. The non-transitory computer-readable medium of claim 12, wherein the executable instructions, which upon execution by the computer, enables the computer to further execute: after receiving the macro chosen, determining at least one parameter defined in the macro chosen and displaying the at least one parameter determined for the user to set; or determining at least one parameter defined in the macro chosen, based on the application type determined and displaying the at least one parameter determined for the user to set.

14. The non-transitory computer-readable medium of claim 12, wherein the executable instructions, which upon execution by the computer, enables the computer to further execute: after receiving the macro chosen, determining at least one parameter defined in the macro chosen, based on the control type determined and displaying the at least one parameter determined for the user to set, or determining at least one parameter defined in the macro chosen, based on the control type determined and the application type determined and displaying the at least one parameter determined for the user to set.

* * * * *